US012731168B1

(12) United States Patent
Salazar et al.

(10) Patent No.: US 12,731,168 B1
(45) Date of Patent: Sep. 8, 2026

(54) WEBSITE TRIAL SERVICE

(71) Applicant: United Services Automobile Association (USAA), San Antonio, TX (US)

(72) Inventors: Gabrielle Diane Salazar, San Antonio, TX (US); Dustin Bowen Bitter, Lehi, UT (US); Mitzi Ruiz, San Antonio, TX (US); Jeanie Graciela Lopez, San Antonio, TX (US); Oscar Guerra, San Antonio, TX (US); William Daniel Farmer, Carrollton, TX (US); Jennifer Marie Chandler-Bradley, Tampa, FL (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/093,097

(22) Filed: Jan. 4, 2023

(51) Int. Cl.
*G06F 16/954* (2019.01)
*G06Q 30/0235* (2023.01)

(52) U.S. Cl.
CPC ....... *G06Q 30/0235* (2013.01); *G06F 16/954* (2019.01)

(58) Field of Classification Search
None
See application file for complete search history.

(56) References Cited

U.S. PATENT DOCUMENTS 6,978,232 B1 * 12/2005 Tobler ..................... H04L 67/02 703/21
8,185,877 B1 * 5/2012 Colcord .................... G06F 9/44 717/124
8,845,337 B1 * 9/2014 Hu ......................... G06Q 10/10 434/379
8,905,763 B1 * 12/2014 Hu ......................... G09B 19/00 715/705
10,789,147 B1 * 9/2020 Patzer ................. G06F 11/3409
10,901,597 B1 * 1/2021 Nandanuru ......... G06F 3/04847
10,956,833 B1 * 3/2021 Yamane .................... G06F 8/77
11,477,134 B1 * 10/2022 Khmelev .............. H04L 47/781
11,540,013 B1 * 12/2022 Gupta .............. H04N 21/44204
2003/0174820 A1 * 9/2003 Kimura ................. H04M 15/90 379/112.04
2013/0198320 A1 * 8/2013 Ahmed ............... G06F 11/3664 709/217
2015/0039505 A1 * 2/2015 Jin ..................... G06Q 20/4018 705/44
2017/0193483 A1 * 7/2017 Cole ................... G06F 3/04847
2017/0193501 A1 * 7/2017 Cole .................... G06Q 20/326
2019/0199750 A1 * 6/2019 Chen ....................... H04L 41/22
2020/0090148 A1 * 3/2020 Lawrence ............ G06Q 20/229
2020/0167798 A1 * 5/2020 Lee ........................ G06N 20/20
2022/0180344 A1 * 6/2022 Fenichel ............ G06Q 20/3221
2022/0345874 A1 * 10/2022 Buscher ................ H04W 24/04
2023/0007004 A1 * 1/2023 Ball ....................... G06Q 20/20
2023/0289792 A1 * 9/2023 Bharucha ............ G06Q 20/354

* cited by examiner

*Primary Examiner* — Mathew Syrowik
(74) *Attorney, Agent, or Firm* — Fletcher Yoder, P.C.

(57) ABSTRACT

Techniques are provided herein to provide a trial for membership-based webservices. Specifically, artificial data and/or user data from alternative webservices are obtained to temporarily populate records useful for a webservice trial. In this manner, the trial may make use of a common codebase accessed by actual members, resulting in an efficient and realistic trial experience.

20 Claims, 6 Drawing Sheets

700
BANK 2
TEMPORARY MODE - FOR EVALUATION ONLY!
ACCOUNTS
PAY &TRANSFER
TRADE
SECURITY
TRANSFER MONEY
PAY BILLS
TRANSFER FROM:
CHECKING ACCOUNT
TRANSFER TO:
SAVINGS ACCOUNT
AT:
NOW
AMT:
$200.00
SUBMIT
CANCEL

BANK 2
702
TEMPORARY MODE - FOR EVALUATION ONLY!
TRANSFER COMPLETE!
(PLEASE NOTE: THESE IS A SIMULATION ONLY FOR PERSPECTIVE CLIENT. NO ACTUAL TRANSFER HAS OCCURRED)

WEBSITE TRIAL SERVICE

BACKGROUND

The present disclosure is related to a service that provides trial access to a website. More specifically, the present disclosure is related to providing a trial access to a membership-based website that typically requires an account to access.

As increased transactions are occurring online, it is becoming increasingly important to provide web-services that equip members to autonomously complete actions associated with an organization's offered services. The offered web-services and their usability may be a key determining factor in deciding particular service providers to use in future endeavors. Unfortunately, however, many web-services are only accessible after an account is created, which oftentimes requires a significant amount of effort, time, and potentially provision of private information that is maintained with the system. This may cause reduced membership capture.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein provide a mechanism for providing a trial to membership-based webservices, without/independent from creating an account and/or committing to membership. In a guest mode, a user is able to access web services provided by an organization without an account. To do this, a temporary account is generated, using artificial data, which, in some cases, may be generated on the fly based upon one or more characteristics of the user and/or members of the webservices. The artificial data may be used to perform the functions of the webservices, thus providing the user with a trial of webservice offerings. Upon logout and/or inactivity for a threshold amount of time, the artificial data (and any additional data generated during use of the guest mode access) may be wiped from the system, resulting in increased security and privacy of the user while affording the user the ability to try the webservices prior to committing to membership.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, it may be beneficial to provide a trial of membership-based webservices to users without requiring the user to create an account or commit to membership. This may help increase membership commitments and reduce membership churn, by providing a pre-membership view of webservice offerings provided by an organization, enabling a user to understand what webservices will be provided prior to membership sign up. Further, the trial may be improved by providing a personalized trial, which uses custom tailored data pertaining to the user to drive the functionality of the webservices. For example, in some instances, real information of the user may be obtained from a related, but different, webservice that the user is already a member of. In some instances, user characteristics are used to generate artificial data selected based at least in part upon the user characteristics. With the foregoing in mind, the present embodiments disclosed herein facilitate such a webservice trial.

Figure 1:
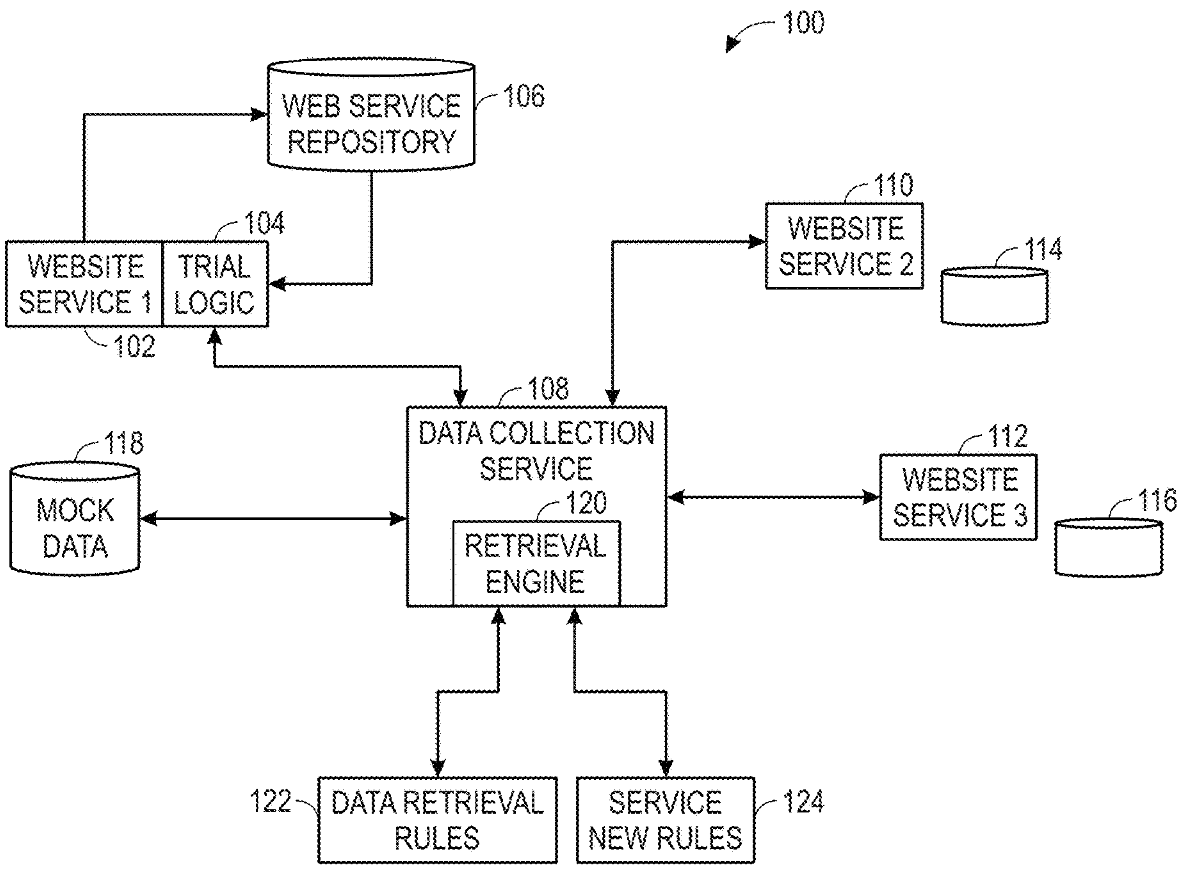
FIG. 1 is a diagram of a system including components useful for providing webservices trials, in accordance with aspects of the present disclosure.

By way of introduction, FIG. 1 is a diagram of a system 100 that includes components useful for providing webservices trials, in accordance with aspects of the present disclosure. A first webservice 102 is equipped with trial logic 104, which facilitates a temporary account creation for the first webservice 102. To do this, the trial logic 104 obtains data needed to generate an account and populates the pertinent tables of the webservice repository 106 that are used to log in and use the pertinent functionality of the webservice 102. For example, the trial logic 104 may obtain an indication of user account fields and tables that are required and/or are optional and populate these tables with obtained information (independent of manual provision of the obtained data into the webservice 102).

Further, additional data may be populated based upon the webservice 102 features that will be accessed in the trial. As may be appreciated, generating and populating data for extensive webservices may require a significant amount of data processing. Accordingly, the amount of data may be reduced by efficiently pinpointing data that will likely be necessary to provide a trial of predicted features that the user will access, while refraining from obtaining and/or populating data for features unlikely to be accessed by the user. In the event that unpredicted features are accessed, the trial logic 104 may obtain and populate the data for such features as the features are accessed. A graphical indication indicating that this is occurring may be provided to the user, so that the user is notified that any data population delay would not be experienced in a real webservice experience, as the data would already be populated. Turning now to an example, if the user is located in the United States, in some instances, it may be assumed the user will not access European features of the webservice and, thus, refrain from populating data associated with these European features, while data associated with the United States experience is populated. If the user did switch localization to a European country, thus, triggering European functionality, the European functionality data would be obtained and populated in the webservice repository 106 on the fly, while providing an indication of the dynamic population to the user performing the trial.

Any number of characteristics may be utilized to predict which features the user may access. In some embodiments, a location of the user, demographics of the user, known services that the user is already a member of, etc. may indicate a subset of features that the user will likely be interested in and/or access. A machine learning model may be useful to correlate patterns of characteristics with particular predicted subsets of features (e.g., by training the model with previous trial information indicating characteristics and actual features accessed in past trials).

The trial logic 104 may obtain the trial data from a data collection service 108 (which may be local to or remote from the trial logic 104). As mentioned above, in some situations, the trial data may include real data pertaining to the user that is sourced from a different, webservice (e.g., webservice 2 110 and/or webservice 3 112). For example, these webservices may include account information stored in databases 114 and 116, respectively. This information may be transformed from the data structure of the source webservice into a data structure of the webservice repository 106, enabling the information to be used by the trial logic and, ultimately, the webservice 102.

The data may also be retrieved from a mock or artificial datastore 118, which may store a comprehensive set of information where subsets of the information may be more applicable to particular groups of users (e.g., based upon characteristics of the users). The data collection service 108 may identify these characteristics and determine what subset of information to obtain for use by the trial logic 104, based upon these characteristics.

The data collection service may include a retrieval engine 120, which is used to retrieve information pertinent to the trial from the webservices (e.g., webservice 2 110 and/or webservice 3 112) and/or the mock data store 118. To do this, the retrieval engine may utilized data retrieval rules 122, which provide conditions of the characteristics that identify the subsets applicable to the user. Further, service navigation rules 124 may be used to identify particular features and/or pages of the webserver to access to obtain the pertinent information from the source webservice (e.g., webservice 2 110 and/or webservice 3 112). These rules may be webservice specific, providing an indication of how to reach portions of the webservice where the information may be presented and, thus, obtained for use by the trial logic 104. For example, if webservice 1 102 is an online banking platform that provides online banking experiences for a banking organization that a user may be interested in moving to, the pertinent information that may result in the most realistic trial, may be information from the user's current banking platform (e.g., of Bank X, a bank that the user is currently a member of). Service navigation rules 124 specifically associated with Bank X may be identified and used to provide the retrieval engine instructions on all of the features and/or pages to navigate to have the needed pertinent information presented. The retrieval engine, using the user's Bank X credentials (which are supplied to the data collection service 108 by the user), may then navigate to these features/pages and retrieve the presented information. Once collected, the information may be supplied to the trial logic 104 and/or the webservice repository 106, where it is temporarily stored and used to facilitate the trial of webservice 1 102.

In some instances, the webservices sourcing the user's data may not have a full set of information desired to facilitate the trial of the webservice 1 102. This may be especially true when webservice 1 102 is feature-rich, having additional features that may require additional data that a simpler information source webservice does not include. In such a case. The user's actual information may be supplemented via a gap-fill measure. Specifically, the data collection service 108 may satisfy gaps in information with relevant subsets of information from the mock datastore 118. In this manner, a complete data set may be provided to the webservice data repository 106, providing the basis for a desirable trial of the webservice 1 102.

Figure 2:
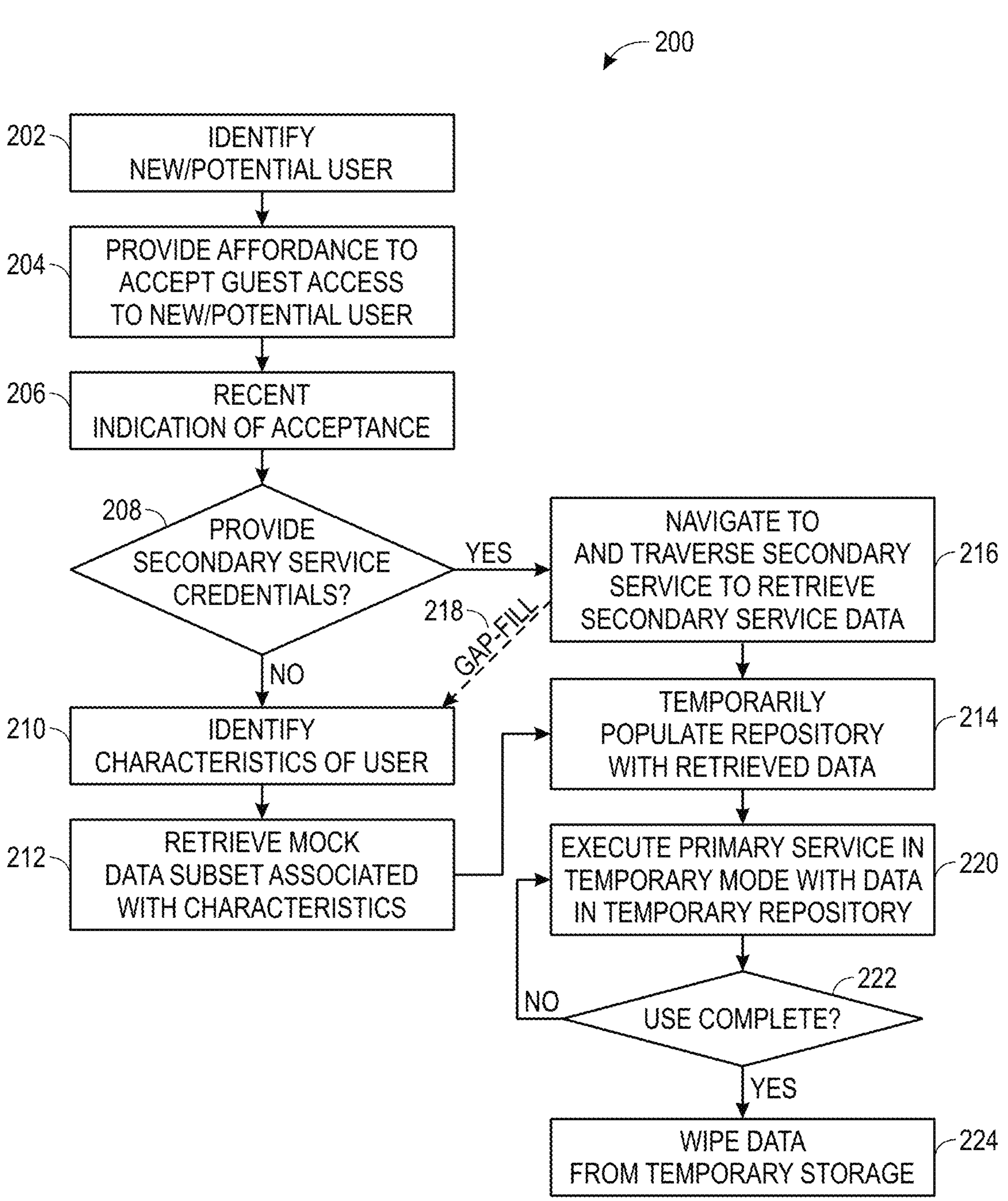
FIG. 2 is a flowchart, illustrating a process for providing a webservice trial, in accordance with aspects of the present disclosure.

Turning now to detailed steps for performing a webservice trial, FIG. 2 is a flowchart, illustrating a process 200 for providing a webservice trial, in accordance with aspects of the present disclosure. The process 200 begins with identifying a new/potential user to a webservice (block 202). For example, a cookie (or lack thereof) may indicate whether a user is a member of and/or has previously accessed the webservice.

When a new user is indicated, the webservice may dynamically provide an affordance to accept guest access to the webservice (block 204). In some embodiments, this affordance is dynamically withdrawn from provision when the user is indicated as new or is indicated as having a current account/membership. The cookie may serve many purposes. For one, it may be used to identify potential users in comparison to existing users, which may result in altered graphical user interface (GUI) views. Also, the cookie may be used to track whether the user has previously performed a trial. The user may be limited to a specific number of trial runs before this functionality is no longer offered. Thus, by tracking a number of visits and/or trials, the user may be blocked from running more than a maximum threshold of trial runs.

When the user is new and/or has not run the maximum number of trials, the user may select the affordance to accept the guest access to the webservice. Upon receiving an indication of the acceptance (block 206), in some embodiments the user may be provided with an optional prompt to provide an indication of related, but different, webservices that the user has an account with, which may be used to source data for the guest mode/trial of the webservice.

At decision block 208, when the user opts not to provide an indication of other webservices to source information from or does not provide credentials to such webservices, artificial information may be obtained, where an effort is made to tailor the information to the user.

At block 210, characteristics of the user are identified. Specifically, prompts provided to the user, data stored on the user's computer (e.g., cookies), and/or other information may be accessed to identify demographics of the user, such as gender, age, family makeup, income level, etc.

These characteristics are used to retrieve mock data subsets associated with the characteristics (block 212). In some embodiments, a machine learning model may be used to identify correlations between characteristics and certain features of the mock data. For example, in certain embodiments, such as during availability of particular known examples that correlate to future predictions, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally and/or alternatively, in some situations, it may be beneficial to utilize unsupervised learning (e.g., when particular output types are not known). Unsupervised learning algorithms take a set of data that contains only inputs and find structure in the data, such as grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data. In any case, machine learning may be used to identify residence locations, work locations, and/or other enrollment data for one or more individuals. In certain embodiments, the algorithms are updated over time (e.g., based on new data from the one or more individuals; the new data from the one or more individuals is used as training examples to update and improve the algorithms over time).

The machine learning model(s) may be used to identify the subsets of mock data and temporarily populate a repository used by the webservice with the retrieved data (block 214), resulting in temporary data that may be used by the trial. The temporarily populated data may be associated with a temporary account generated for the user's trial. The temporary account and temporarily populated information may persist for a particular time window, enabling the trial to be accessed/used during the time window, as will be discussed in more detail below.

If, at decision block 208, the user does supply an indication of a source webservice and credentials, user data may be sourced from the source webservice. The source webservice is accessed and pertinent information is retrieved from the source webservice (block 216). As mentioned above, the data retrieval rules 122 may provide navigation instructions, which instruct the retrieval engine 120 on how to access the source webservice and the features/pages to access to enable the retrieval engine 120 to retrieve the information. For example, returning to our previous example, if the user indicates with Bank X with Bank X credentials, the Bank X retrieval rules may be accessed, which instruct the retrieval engine 120 to access www.Bank X.com. Further, the data retrieval rules 122 may include instructions enabling automated navigation through www.BankX.com to access particular pages (e.g., a transaction details page, when retrieving banking transactions), where presented data on the accessed pages are captured. The automated navigation instructions may be in any form that enables the retrieval engine 120 to perform automated access and/or navigation. For example, in some embodiments, a robotic process automation (RPA) script may be provided, which may be implemented by the retrieval engine 120, enabling automated navigation and data capture. In some embodiments, the data may be captured using a screen capture tool combined with optical character recognition. The rules may describe portions of the screen where particular types of pertinent information will be provided, such that these pieces of information may be captured, classified, and used to populate data fields in the web service repository 106. In some embodiments, the underlying webpage code (e.g., HTML) used to provide the webservice view in a web browser may be used to capture the pertinent information. The rules may describe particular areas within the webpage code where particular pertinent information may be found, thus facilitating proper capture and classification of the source data.

As mentioned above, the data captured at the source webservice may be in a different format than the format used by the webservice that will be providing the trial. Accordingly, a data transformation process may be implemented prior to temporarily populating the repository with the retrieved data and associating with the user's temporary account at block 214. For example, the source webservice may store transaction dates in the format MM-DD-YYYY, while the webservice that will provide the trial may store transaction dates in the date format YYYY-MM-DD. Thus, the data transformation process may convert the source webservice data format into the format of the webservice that will provide the trial, such that the data may be properly stored in the webservice's data repository 106.

As described above, in some embodiments, the source webservice does not provide all of the desired source information useful for facilitating the trial. In such a case, a gap-fill procedure 218 may be used to fill gaps in the information provided by the source webservice. To do this, characteristics of the user are identified (block 210), as described above. Then, the missing data is obtained from the mock data repository 118 based upon the characteristics (block 212), as described above. This gap-fill information is temporarily populated in the repository and associated with the user's temporary account.

At this point, the webservice is ready for a trial run. The webservice is executed in temporary mode, by using the temporary account and the associated temporarily populated retrieved information (block 220). Thus, the user is able to interact with the webservice as if they were a member with a webservice account.

As mentioned above, the account and the populated data only temporarily persist. At decision block 222, a determination is made as to whether the use is complete and/or a trial allowance time period has been reached. For example, use may be determined to be complete when the user closes their browser, exceed a threshold period of inactivity, logs out of the webservice, etc. In some embodiments, such completed use may instantly result in removal of the temporary account and temporarily populated data. In some embodiments, the temporary account and information may not immediately be removed, but instead left until a trial window is reached. In this manner, the user may discontinue use of the trial but return, so long as the trial window has not been exceeded.

If not, the trial may continue to be executed and/or accessed, by allowing the temporary account and associated temporarily populated data to be maintained in the webservice repository 106.

However, when the use is completed and/or the trial window is complete, the temporary account and information is wiped from the webservice repository (block 224).

Figure 3:
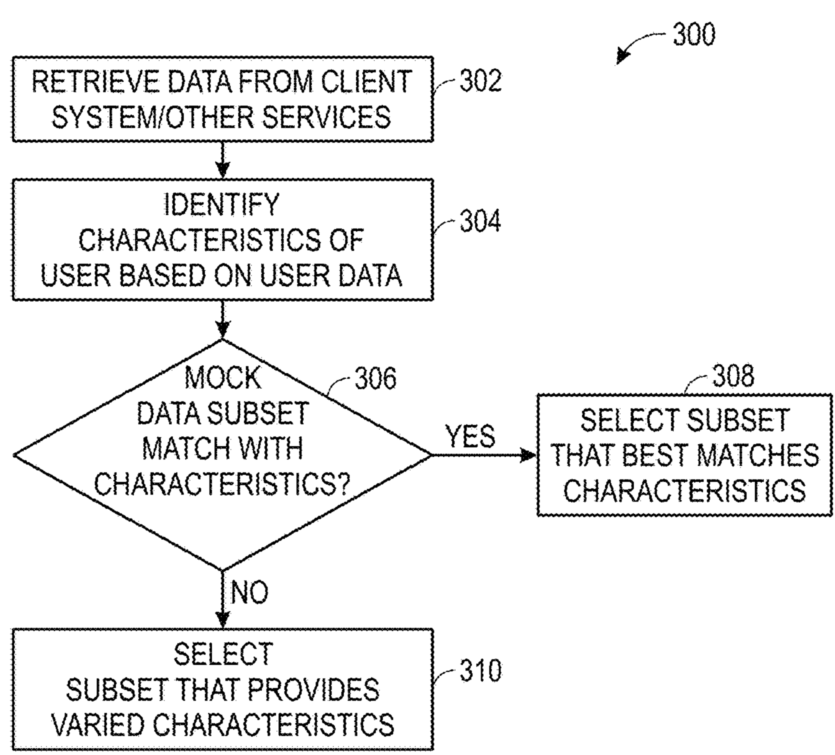
FIG. 3 is a flowchart, illustrating a process for generating artificial data based upon user characteristics, in accordance with aspects of the present disclosure.

Turning now to a more detailed discussion of obtaining the artificial data, FIG. 3 is a flowchart, illustrating a process 300 for generating artificial data based upon user characteristics, in accordance with aspects of the present disclosure. The process 300 begins with retrieving user data from client systems and/or other services that provide data about the user (block 302). For example, cookie(s) may provide an indication of user demographics, including interests, memberships, etc. Further, user prompt responses and/or other data sources may provide characteristics of the user. Thus, characteristics of the user may be identified based upon this data (block 304).

A determination is made as to whether any of the mock data correlates with the identified characteristics (decision block 306). As mentioned above, machine learning models may be used to identify correlations between characteristics and subsets of mock data. These machine learning models may also identify a correlation strength (e.g., from 1 to 100) indicative of how likely the information is to correlate with the identified characteristics. If the correlation strength is above a desired correlation threshold a match is identified and the subset of mock data correlating to identified characteristics is selected for temporary population in the webservices repository 106 (block 308).

However, when the correlation strength does not meet the correlation threshold, this may indicate no match. In such a case, where the mock data does not appear to correlate well with the user's characteristics, a subset of the information may be selected that provides correlation with varied characteristics (block 310). In this manner, it may be clear that the information is not representative of actual data that the user might experience with their own personalized information populating the system, as at least some of the subset may match their demographics but other information may vary from their demographics.

Figure 4:
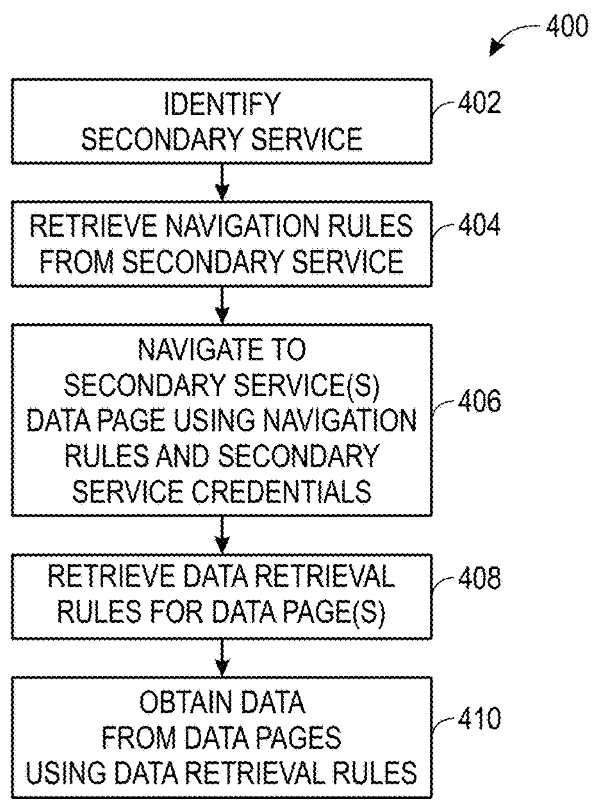
FIG. 4 is a flowchart, illustrating a process for obtaining data for use in a webservice trial from a related, but different, webservice, in accordance with aspects of the present disclosure.

FIG. 4 is a flowchart, illustrating a process 400 for obtaining data for use in a webservice trial from a related, but different, webservice, in accordance with aspects of the present disclosure. The process 400 begins by identifying a source webservice "secondary service that information can be obtained from. For example, as mentioned above, in some embodiments, this may be identified by explicitly receiving an indication of the secondary service from a user (e.g., via a GUI prompt). Further, credentials enabling login to the secondary service are obtained.

Next, navigation rules for the secondary service are retrieved (block 404). For example, as mentioned above, a subset of navigation rules that are specifically associated with the secondary service are obtained from a library of navigation rules of a plurality of secondary services. The navigation rules provide instructions for navigation through the webservice (e.g., page accesses through specified link selections, specified application programming interface (API) calls, etc.) In some embodiments, the navigation rules may include a macro or a robotic process automation (RPA) script that provides automated navigation when executed.

Next, the data provision portions of the secondary service are accessed, in accordance with navigation rules (block 406). For example, the macro and/or RPA script may be executed, causing automated navigation through portions of the webservice.

As the navigation occurs, data from the accessed portions of the secondary service are retrieved. This is done by retrieving data retrieval rules for the portions of the secondary service (block 408) that describe data portions of these portions of the secondary service with pertinent information. Once these data portions are identified at the accessed portions, the data in these data portions are obtained (e.g., in accordance with the data retrieval rules) (block 410). In one example, the data retrieval rules may indicate that data between the second set of paragraph tags on page 1 (e.g., <p> and </p>) a total account balance is presented and should be retrieved for population in the "balance" field of Table "Acct" Field "Tot Balance" on a row associated with the user's temporary account. In another example, the data retrieval rules may provide instruction on how to perform an export functionality from the secondary service, resulting in an export file being downloaded (e.g., a comma delimited (CSV) file, containing multiple pieces of data. The data retrieval rules may provide an indication of how to parse this data into individual pieces and provide instructions as to how the webservice repository 106 should be populated with these individual pieces (e.g., by specifying tables/fields/rows to populate).

Figure 5:
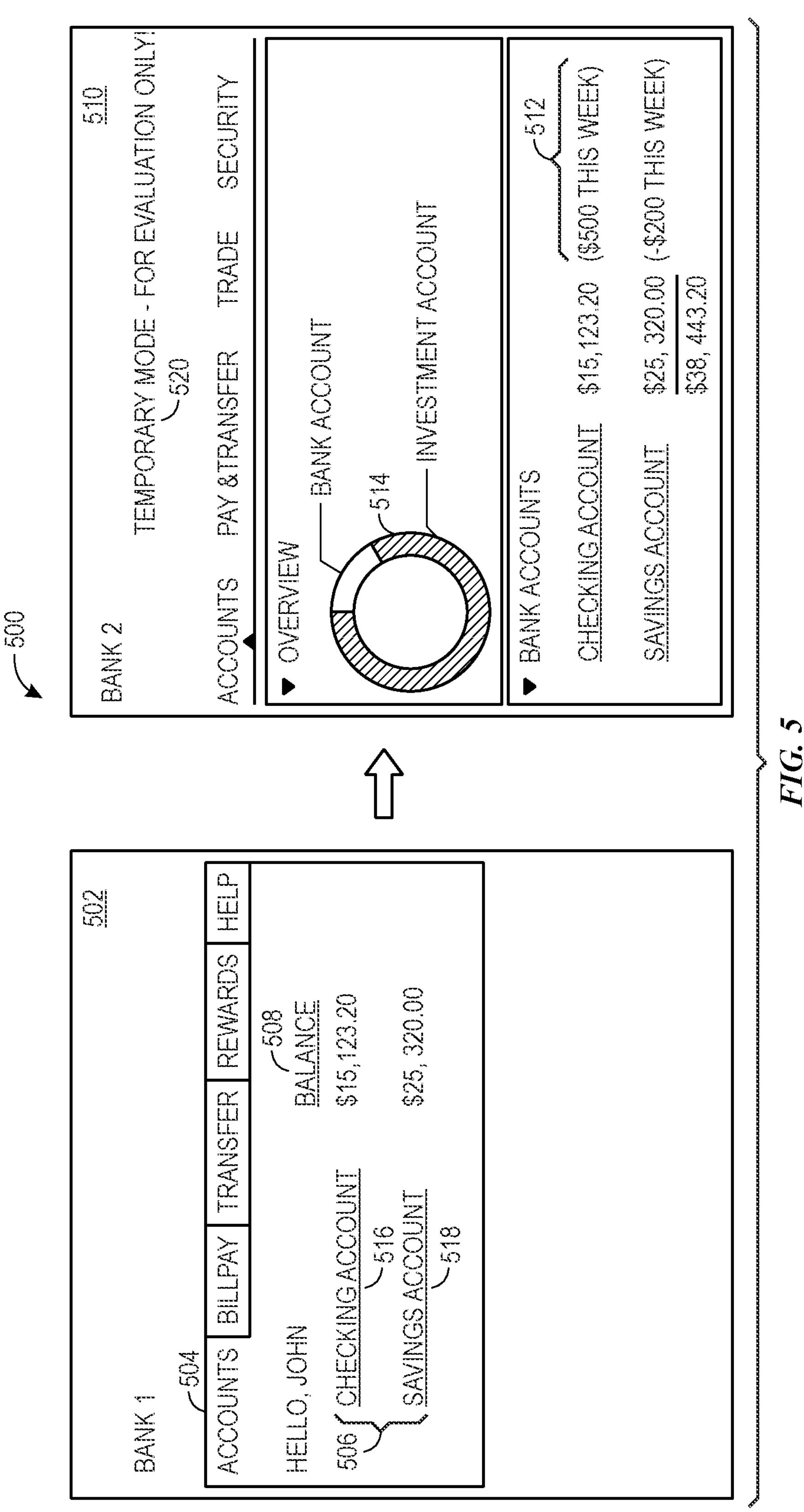
FIG. 5 is a diagram, providing a sample illustration of a webservice trial where data is supplied from a related, but different, webservice, in accordance with aspects of the present disclosure.

Continuing with the Banking Example, FIG. 5 is a diagram, providing a sample illustration 500 of a webservice trial where data is supplied from a related, but different, webservice, in accordance with aspects of the present disclosure. Source webservice GUI (e.g., the "Bank 1 GUI" 502) is navigated to based upon an indication by the user that they currently bank and "Bank 1" and provision of the login credentials to the Bank 1 webservice. Upon receiving the credentials, the retrieval engine 120 identifies the service navigation rules 124 associated with Bank 1 and he data retrieval rules 122 associated with the pages of the Bank 1 GUI 502. The service navigation rules 124 cause the retrieval engine to select an Accounts tab 504, which causes display of the user's current account balances 506. The data retrieval rules 122 provide an instruction to capture these account balances 506, for example, by instructing the retrieval engine 120 to capture information between certain HTML tags, to capture values under a "Balance" header 508, to capture dollar values in the right-third of the GUI 502, etc.

The captured balances 508 may be used to temporarily populate the webservice repository with information associated with a temporary user account used in a trial of a webservice (e.g., the "Bank 2" webservice). As illustrated, the Bank 2 GUI 510 is quite different than Bank 1 GUI 502. Further, the Bank 2 GUI 510 includes features not found on the Bank 1 GUI 502, where the added features require additional data, such as weekly transaction amounts 512 associated with the user's accounts and a total amount of money in investment accounts, which is used to illustrate the overview breakdown of accounts 514.

While Bank 1 does not provide a weekly transaction amount, Bank 1 does provide individual transactions, which can be used to identify a weekly transaction amount. Accordingly, the data retrieval rules 122, in conjunction with the service navigation rules 124 may instruct the retrieval engine 120 to download a transaction export by selecting links 516 and/or 518. This may result in download of a transaction report, where the data retrieval rules instruct the data retrieval engine 120 to aggregate the transaction amounts into week amounts, by adding transaction amounts that fall within a common week. In this manner, actual user may still be sourced, despite the source webservice not specifically providing the needed data.

As mentioned above, when a source webservice does not provide certain data, gap-fill measures may be used to retrieve the missing data. For example, Bank 1 may not provide investment services. Accordingly, there may be no indication of an amount of money the user has in investment services. Without this data, the overview breakdown of accounts may not be populated and/or may provide less understanding of the capabilities of the webservice during the trial. Accordingly, data may be populated from the mock data repository 118. As mentioned above, characteristics may be used to identify a likely data value for an amount of investment services. For example, the demographic information of the user may be fed into a machine learning model that identifies that other users with similar demographics have, on average, $10,000 in investment accounts. Accordingly, this may be used as the artificial data useful to present the overview breakdown of accounts 514. As may be appreciated, the current techniques provide a robust solution that provides flexibility while personalizing a webservice trial. Further, as illustrated in the GUI 510, a notification 520, indicating that the user is in a temporary or trial mode for evaluation of the webservices is provided. This notification 520 may be provided whenever a temporary user account is used to access the webservice, which may be indicated via a flag in the account database, a format of the account name or password, etc. In this manner, no separate code base is necessary for providing the trial, which may improve the realistic nature of the trial, by using the actual code base used by members of the webservice.

Figure 6:
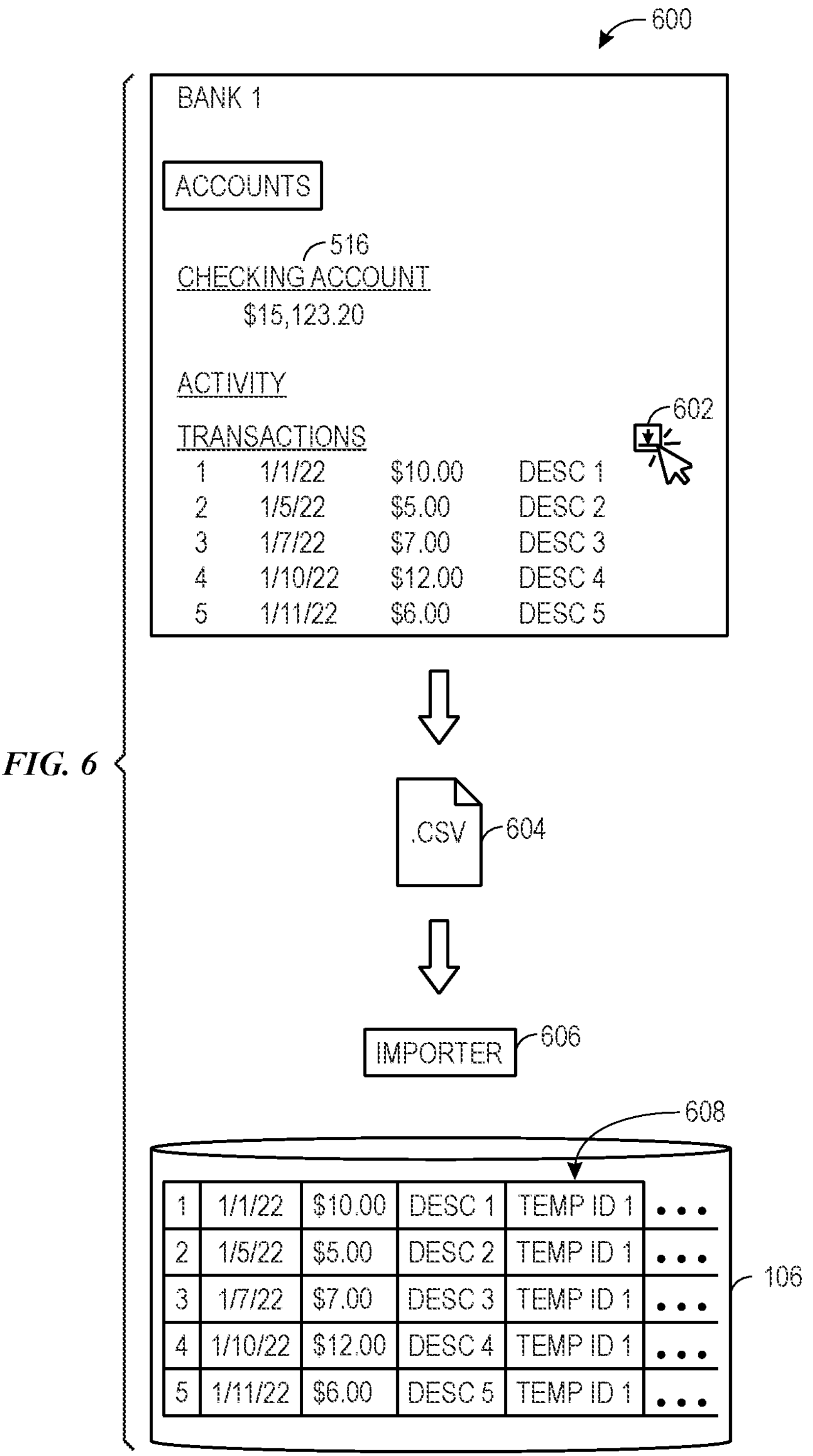
FIG. 6 is a diagram, illustrating retrieval of source data from a source webservice, in accordance with aspects of the present disclosure.

FIG. 6 illustrates an example 600 of a data retrieval engine retrieving a trial user's source information for use in the trial. As discussed above, the data retrieval rules 122, in conjunction with the service navigation rules 124 may instruct the retrieval engine 120 to download a transaction export by selecting links 516 and/or 518. In example 600, the data retrieval rules 122 include an additional instruction to select the download affordance 602, which is dynamically presented after selecting the link 516. This may result in download of a transaction report 604 (here a CSV file). An importer functionality 606 transforms the data and causes the data to be temporarily stored in the webservice repository 106 for use in the trial, as described above. As illustrated, the transformation may include associating the transactions with a particular temporary user identifier 608 of the trial user. In this manner, it can be ensured that the trial user logged in as "TempId1" is the user who's trial will be facilitated with this data. As mentioned above, in some embodiments, the importer 606 may cause additional aggregations (e.g., summations, average, medians, etc. over a range of time) from the imported data, when such aggregations are stored for users in the webservices repository 106. Otherwise, when the codebase performs the aggregations based upon the individual transactions stored in the webservice repository 106, no such aggregation calculations are performed by the importer 606. As may be appreciated, this may be dictated by the data retrieval rules 12.

Figure 7:
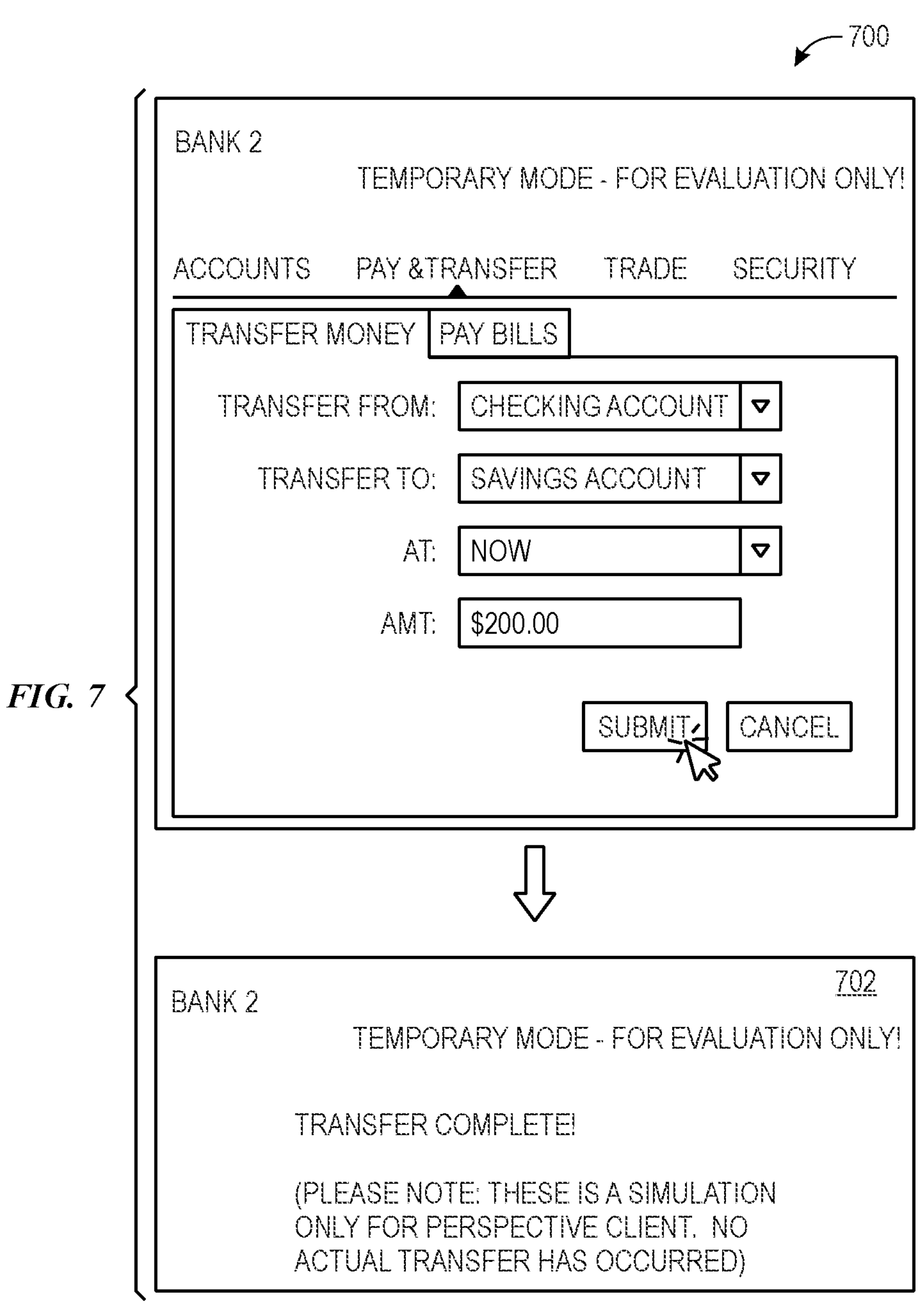
FIG. 7 is a diagram, providing a sample webservice trial interaction, where temporary data is generated during the trial, but removed upon logout from and/or inactivity with the webservice trial, in accordance with aspects of the present disclosure.

Turning now to interaction with the trial, FIG. 7 is a diagram, providing an example 700 of a webservice trial interaction, where temporary data is generated during the trial, but removed upon logout from and/or inactivity with the webservice trial, in accordance with aspects of the present disclosure. As illustrated, the trial user may access many, if not all, of the features of the webservice during the trial. However, because the user is a trial user, these interactions should not cause production data changes within the webservice. While interactive changes may be displayed to the user, these interactions should not propagate into actual production data, which may cause erroneous outputs, such as webservice reporting etc. Accordingly the code base of the webservice may identify the temporary user log in. trial mode and may pivot interaction data changes to a trial repository to ensure that the user's interactions to not affect production data. Further, in some embodiments, the interactions may cause behind the scenes skipping of actual implementation of a feature, while providing a notification to the user mimicking implementation of the feature. For example, in FIG. 7, a trial user has chosen to transfer $200 from a checking account to a savings account. Upon submitting the request, a prompt 702 indicates that the transfer is complete, but also notes that no actual transaction has occurred, as the user is in a trial for evaluation purposes only. In this manner, the user is able to evaluate the GUI, while the transaction does not affect actual execution of the webservice functionality by actual members.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein. In addition, although the foregoing description is detailed as being performed by a quantum computer, it should be noted that classical processing and computer systems may perform the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A tangible, non-transitory, computer-readable medium, comprising computer-readable instructions that, when executed by one or more processors of one or more computers, cause the one or more computers to:

operate a webserver in communication with a membership-based webservice, a user computing device of a requestor, and a source webservice hosting an existing account of the requestor, wherein the source webservice and the membership-based webservice are different providers of web services providing a common set of functionalities and that utilize login credentials to secure membership accounts;

receive, by the webserver and from the computing device of the requestor, a request to obtain trial-based access to the membership-based webservice, the trial-based access allowing the requestor to try out a guest version of the membership-based webservice, the guest version providing webpage views on one or more webpages of the membership-based webservice to simulate webpage views provided to members of the membership-based webservice;

identify, by the membership-based webservice and based on the request, the requestor as currently having a non-member status with the membership-based webservice based on the requestor having neither a membership-based account with the membership-based webservice nor a commitment to obtain membership to the membership-based webservice;

identify, by the membership-based webservice and based on the request, login credentials used by the requestor to access the existing account at the source webservice;

access, by the webserver utilizing the login credentials of the requestor, the source webservice via a website to collect information about the existing account of the source webservice;

navigate, using navigation instructions specific to the source webservice, the existing account of the requestor to obtain user account information;

capture and import the user account information from the existing account of the requestor at the source webservice;

predict, based on the user account information imported to the membership-based webservice, features of the membership-based webservice that will interest the requestor while the requestor tries the guest version of the membership-based webservice;

create, by the membership-based webservice, a temporary account providing the computing device of the requestor with the trial-based access to only the guest version of the membership-based webservice;

populate, by the membership-based webservice executing the one or more webpages of the membership-based webservice, the temporary account with the features, with actual data obtained from the user account information of the requestor, and with mock data of the membership-based webservice, the populating including supplementing the actual data with the mock data to complete execution of the features in the guest version of the membership-based webservice;

present, to the computing device of the requestor and by the membership-based webservice executing the one or more webpages of the membership-based webservice, the guest version of the membership-based webservice on the one or more webpages including the features, the actual data and the mock data to personalize presentation of the temporary account to the requestor while the guest version of the membership-based webservice is accessed by the computing device of the requestor;

determine, by the membership-based webservice, an ending of the trial-based access to the membership-based webservice; and remove, after determining the ending of the trial-based access, the temporary account from the membership-based webservice including removing all of the actual data and the mock data from the membership-based webservice to enhance user privacy with respect to the membership-based webservice.

2. The computer-readable medium of claim 1, comprising computer readable instructions that, when executed by the one or more processors, cause the one or more computers to:

track a number of visits of the temporary account to the membership-based webservice; and block use of the temporary account based on exceeding a maximum threshold of trial runs.

3. The computer-readable medium of claim 1, comprising computer readable instructions that, when executed by the one or more processors, cause the one or more computers to:

track one or more interactions of the guest version of the membership-based webservice; and display the one or more interactions to a user of the trial-based access without propagating the one or more interactions into production data of the membership-based webservice.

4. The computer-readable medium of claim 1, comprising computer readable instructions that, when executed by the one or more processors, cause the one or more computers to:

identify a temporary time allotment for storing the user account information, the mock data, or both;

temporarily store the user account information, the mock data, or both for the temporary time allotment; and remove the user account information, the mock data, or both after the temporary time allotment is exceeded.

5. The computer-readable medium of claim 4, comprising computer readable instructions that, when executed by the one or more processors, cause the one or more computers to:

identify a completion of use of the trial-based access based upon logout; and identify the temporary time allotment based upon the completion of use.

6. The computer-readable medium of claim 1, comprising computer readable instructions that, when executed by the one or more processors, cause the one or more computers to:

retrieve the user account information from the source webservice by:

obtaining the navigation instructions specific to the source webservice;

navigating the source webservice in accordance with the navigation instructions; and while navigating the source webservice, collecting the user account information.

7. The computer-readable medium of claim 6, wherein the navigation instructions comprise a macro or a robotic process automation script that, when executed, causes automated navigation of the source webservice.

8. The computer-readable medium of claim 6, comprising computer readable instructions that, when executed by the one or more processors, cause the one or more computers to:

transform the user account information from a first format associated with the source webservice to a second format expected by the membership-based webservice.

9. The computer-readable medium of claim 8, comprising computer readable instructions that, when executed by the one or more processors, cause the one or more computers to:

transform the user account information by aggregating portions of the user account information to create new data that is temporarily stored for use by the membership-based webservice.

10. A computer-implemented method, comprising:

operating a webserver in communication with a membership-based webservice, a user computing device of a requestor, and a source webservice hosting an existing account of the requestor, wherein the source webservice and the membership-based webservice are different providers of web services providing a common set of functionalities and that utilize login credentials to secure membership accounts;

receiving, by the webserver and from the computing device of the requestor, a request to obtain trial-based access to the membership-based webservice, the trial-based access allowing the requestor to try out a guest version of the membership-based webservice, the guest version providing webpage views on one or more webpages of the membership-based webservice to simulate webpage views provided to members of the membership-based webservice;

identifying, by the membership-based webservice and based on the request, the requestor as currently having a non-member status with the membership-based webservice based on the requestor having neither a membership-based account with the membership-based webservice nor a commitment to obtain membership to the membership-based webservice;

identifying, by the membership-based webservice and based on the request, login credentials used by the requestor to access the existing account at the source webservice;

accessing, by the webserver utilizing the login credentials of the requestor, the source webservice via a website to collect information about the existing account of the source webservice;

navigating, using navigation instructions specific to the source webservice, the existing account of the requestor to obtain user account information;

capturing and importing the user account information from the existing account of the requestor at the source webservice;

predicting, based on the user account information imported to the membership-based webservice, features of the membership-based webservice that will interest the requestor while the requestor tries the guest version of the membership-based webservice;

creating, by the membership-based webservice, a temporary account providing the computing device of the requestor with the trial-based access to only the guest version of the membership-based webservice;

populating, by the membership-based webservice executing the one or more webpages of the membership-based webservice, the temporary account with the features, with actual data obtained from the user account information of the requestor, and with mock data of the membership-based webservice, the populating including supplementing the actual data with the mock data to complete execution of the features in the guest version of the membership-based webservice;

presenting, to the computing device of the requestor and by the membership-based webservice executing the one or more webpages of the membership-based webservice, the guest version of the membership-based webservice on the one or more webpages including the features, the actual data and the mock data to personalize presentation of the temporary account to the requestor while the guest version of the membership-based webservice is accessed by the computing device of the requestor;

determining, by the membership-based webservice, an ending of the trial-based access to the membership-based webservice; and removing, after determining the ending of the trial-based access, the temporary account from the membership-based webservice including removing all of the actual data and the mock data from the membership-based webservice to enhance user privacy with respect to the membership-based webservice.

11. The computer-implemented method of claim 10, comprising:

tracking a number of visits of the temporary account to the membership-based webservice; and blocking use of the temporary account based on exceeding a maximum threshold of trial runs.

12. The computer-implemented method of claim 10, comprising:

identifying the requestor as currently having the non-member status with the membership-based webservice based on a cookie residing on a computer of the requestor.

13. The computer-implemented method of claim 10, comprising:

identifying a temporary time allotment for storing the user account information, the mock data, or both;

temporarily storing the user account information, the mock data, or both for the temporary time allotment; and removing the user account information, the mock data, or both after the temporary time allotment is exceeded.

14. The computer-implemented method of claim 13, comprising:

identifying a completion of use of the trial-based access based upon logout; and identifying the temporary time allotment based upon the completion of use.

15. The computer-implemented method of claim 10, comprising:

retrieving the user account information from the source webservice by:

obtaining the navigation instructions specific to the source webservice;

navigating the source webservice in accordance with the navigation instructions; and while navigating the source webservice, collecting the user account information;

wherein the navigation instructions comprise a macro or a robotic process automation script that, when executed, causes automated navigation of the source webservice.

16. The computer-implement method of claim 15, comprising:

transforming the user account information from a first format associated with the source webservice to a second format expected by the membership-based webservice.

17. The computer-implemented method of claim 16, comprising:

transforming the user account information by aggregating portions of the user account information to create new data that is temporarily stored for use by the membership-based webservice.

18. A system, comprising:

a membership-based webservice in communication with a webservice data repository;

the webservice data repository, wherein the webservice data repository comprises data useful for facilitating functions of the membership-based webservice; and webservice trial logic configured to:

operate a webserver in communication with the membership-based webservice, a user computing device of a requestor, and a source webservice hosting an existing account of the requestor, wherein the source webservice and the membership-based webservice are different providers of web services providing a common set of functionalities and that utilize login credentials to secure membership accounts;

receive, by the webserver and from the computing device of the requestor, a request to obtain trial-based access to the membership-based webservice, the trial-based access allowing the requestor to try out a guest version of the membership-based webservice, the guest version providing webpage views on one or more webpages of the membership-based webservice to simulate webpage views provided to members of the membership-based webservice;

identify, by the membership-based webservice and based on the request, the requestor as currently having a non-member status with the membership-based webservice based on the requestor having neither a membership-based account with the membership-based webservice nor a commitment to obtain membership to the membership-based webservice;

identify, by the membership-based webservice and based on the request, login credentials used by the requestor to access the existing account at the source webservice;

access, by the webserver utilizing the login credentials of the requestor, the source webservice via a website to collect information about the existing account of the source webservice;

navigate, using navigation instructions specific to the source webservice, the existing account of the requestor to obtain user account information;

capture and import the user account information from the existing account of the requestor at the source webservice;

predict, based on the user account information imported to the membership-based webservice, features of the membership-based webservice that will interest the requestor while the requestor tries the guest version of the membership-based webservice;

create, by the membership-based webservice, a temporary account providing the computing device of the requestor with the trial-based access to only the guest version of the membership-based webservice;

populate, by the membership-based webservice executing the one or more webpages of the membership-based webservice, the temporary account with the features, with actual data obtained from the user account information of the requestor, and with mock data of the membership-based webservice, the populating including supplementing the actual data with the mock data to complete execution of the features in the guest version of the membership-based webservice;

present, to the computing device of the requestor and by the membership-based webservice executing the one or more webpages of the membership-based webservice, the guest version of the membership-based webservice on the one or more webpages including the features, the actual data and the mock data to personalize presentation of the temporary account to the requestor while the guest version of the membership-based webservice is accessed by the computing device of the requestor;

determine, by the membership-based webservice, an ending of the trial-based access to the membership-based webservice; and remove, after determining the ending of the trial-based access, the temporary account from the membership-based webservice including removing all of the actual data and the mock data from the membership-based webservice to enhance user privacy with respect to the membership-based webservice.

19. The system of claim 18, comprising a data collection service configured to:

receive the credentials for the source webservice;

in response to the request for trial data:

access the source webservice using the credentials;

navigate the source webservice using the navigation instructions specific to the source webservice; and while navigating the source webservice, capture the trial data from the source webservice.

20. The system of claim 19, wherein the data collection service is configured to navigate a plurality of pages of the source webservice in an automated fashion using a macro or robotic process automation script, wherein each of the plurality of pages comprises a portion of the trial data.

* * * * *